US006787231B1

(12) United States Patent
Furman et al.

(10) Patent No.: US 6,787,231 B1
(45) Date of Patent: Sep. 7, 2004

(54) TIN (IV) OXIDE NANOPOWDER AND METHODS FOR PREPARATION AND USE THEREOF

(75) Inventors: Arkadiy A. Furman, Skokie, IL (US); Aleksander A. Andriiko, Kiev (UA); Sergiy M. Maliovanyi, Kiev (UA)

(73) Assignee: Electroplated Metal Solutions, Inc., Elk Grove Village, IL (US)

( * ) Notice: Subject to any disclaimer, the term of this patent is extended or adjusted under 35 U.S.C. 154(b) by 0 days.

(21) Appl. No.: 10/249,472

(22) Filed: Apr. 11, 2003

(51) Int. Cl.[7] .............................................. B32B 15/02
(52) U.S. Cl. .................... 428/402; 428/403; 427/212
(58) Field of Search ............................. 428/402, 403; 427/212

(56) References Cited

U.S. PATENT DOCUMENTS

| | | | | |
|---|---|---|---|---|
| 6,139,816 | A | 10/2000 | Liu et al. ................... 428/608 |
| 6,200,674 | B1 | 3/2001 | Kumar et al. ............... 428/332 |
| 6,395,053 | B1 | 5/2002 | Fau et al. ..................... 75/362 |
| 6,569,490 | B2 * | 5/2003 | Yadav et al. .................. 427/58 |
| 6,569,518 | B2 * | 5/2003 | Yadav et al. ................ 428/323 |
| 6,572,672 | B2 * | 6/2003 | Yadav et al. .................. 75/343 |
| 6,576,355 | B2 * | 6/2003 | Yadav et al. .................. 429/12 |
| 6,586,095 | B2 * | 7/2003 | Wang et al. ................. 428/397 |
| 6,602,543 | B2 * | 8/2003 | Yadav et al. .............. 427/126.1 |
| 6,602,595 | B2 * | 8/2003 | Yadav et al. ................ 428/323 |
| 6,607,779 | B2 * | 8/2003 | Yadav et al. .................. 427/58 |
| 6,607,821 | B2 * | 8/2003 | Yadav et al. ................ 428/323 |
| 6,641,775 | B2 * | 11/2003 | Vigliotti et al. ............. 264/618 |
| 6,656,588 | B1 * | 12/2003 | Laine et al. ................ 428/402 |

OTHER PUBLICATIONS

Jarzebski et al, "Physical Properties of SnO2 Materials" JOES, Jul., 1976.*
Non Patent Citation: Jarzhebski Z.M., Marton J.P., "Physical Properties of SnO2 Materials", Journal of Electrochemical Society, 123, No. 7, Jul. of 1976, 199C.

* cited by examiner

*Primary Examiner*—Leszek Kiliman
(74) *Attorney, Agent, or Firm*—Leonid Khodor

(57) ABSTRACT

A tin (IV) oxide nanopowder essentially free of byproducts and consisting of crystalline particles that have rutile crystalline structure is produced in bulk quantities by an inexpensive process of a chemical reaction of either a tin chloride of tin sulfate in an ionic melt of alkali metal nitrates followed by cooling, leaching with distilled water, and a thermal treatment. The nanopowder exhibits electrical conductivity substantially independent from its temperature in wide range of temperatures. Devices and coatings including the nanopowder are also disclosed.

20 Claims, 1 Drawing Sheet

TIN (IV) OXIDE NANOPOWDER AND METHODS FOR PREPARATION AND USE THEREOF

BACKGROUND OF THE INVENTION

This invention generally relates to the field of fabrication and use of nanometer-scale metal oxide particles, in particular to a tin (IV) oxide nanopowder consisting of crystalline particles and methods for its preparation and use.

Tin (IV) oxide ($SnO_2$) having a rutile-type crystalline structure is an n-type wide band semiconductor in its undoped form. This material is widely used in a variety of devices because it combines chemical stability in acids and bases, high corrosion resistance, and good electrical conductivity with transparency in the visible optical spectrum. For example, nanocrystalline $SnO_2$ powder is often used as a transparent current collector in electrochromic devices, as a conductive high-temperature ceramics, and in gas sensor applications. Further, this material's high corrosion resistance coupled with electrical conductivity has aroused considerable interest in using $SnO_2$ as a non-consumable anode in electrolytic production of aluminum. Finally, $SnO_2$ is a promising anode material for use in lithium rechargeable batteries. Electrochemical performance of $SnO_2$, however, greatly depends upon the particle size, and purity of the nanocrystalline powder.

Traditionally, methods of producing pure $SnO_2$ in a powder form were confined to high-temperature hydrolysis of tin (IV) chloride or to the oxidation of gaseous tin (II) oxide at 1300 K. or higher (see, Jarzhebski Z. M., Marton J. P., *J. Electrochem. Soc.*, 123, No.7, 199C (1976)).

Various processes for the preparation of metal oxide powders in general and of tin oxide powder in particular are disclosed in U.S. Pat. No. 6,139,816. In particular, cracking, physical vapor deposition, chemical vapor deposition, spray pyrolysis, gel method, and hydrothermal method have been disclosed. Cracking is simple but cannot provide the desired particle size and distribution because the particles prepared are not uniform. Both physical and chemical vapor depositions have to be conducted under vacuum conditions and require high operation costs. The particles provided by spray pyrolysis are typically too large to be useful in applications. Gel method can provide a desired particle size but is complex and costly because it uses metal alkoxides, which are expensive and easily flammable. Hydrothermal method is a modification of the gel method that avoids some of its shortcomings by using metal salts instead of alkoxides. The hydrothermal method, however, is also expensive because of high-temperature and pressure conditions of the hydrothermal equipment.

There is also a sol-gel method of preparation of nanocrystalline tin oxide particles, disclosed in U.S. Pat. No. 6,395,053. This method is based on the a basic solution, e.g. $NH_3$. Such synthesis of nanocrystalline tin oxide particles leads to a marked increase of mean particle size when treated at temperatures ranging from 450 to 800° C.

A process, according to U.S. Pat. No. 6,200,674 includes pyrolyzing a molecular stream consisting of a tin precursor, such as $SnCl_4$, an oxidizing gas, such as oxygen, and a radiation absorbing gas in a reaction chamber. The pyrolysis preferably is driven by heat absorbed from a laser beam, such as a $CO_2$ laser. Thusly obtained tin oxide nanoparticles have an average diameter from about 5 nm to about 100 nm. The reaction conditions determine the properties of the tin oxide particles produced by laser pyrolysis. The appropriate reaction conditions, which should be precisely controlled to produce a certain type of particles, generally depend on the design of a particular apparatus.

Known solution-based and pyrolysis-based methods, such as those described above, share common deficiencies, such as high production costs, and complexity of the equipment involved, as well as presence of amorphous phases of SnO and $SnO_2$, crystalline SnO, and byproducts in the final product. The byproducts typically include residues of a tin precursor, such as tin chlorides and organic or inorganic compounds from the solutions. In addition, post-production calcination of the final product, which is typically necessary to crystallize the amorphous phase and to oxidize SnO into $SnO_2$, results in a uncontrolled growth of individual particles and associated sintering of neighboring particles. Such uneven particle growth may compromise the size uniformity of the nanopowder and may even increase the particle size beyond nanometer scale. Because physical properties of oxides, including $SnO_2$, substantially depend on the degree of deviation from the stoichiometric composition (native disorder) as well as on the type and concentrations of impurities incorporated into the crystalline lattice, the unpredictable nature and amount of contamination and size deviation that is inherent in known processes of tin (IV) oxide nanopowder synthesis lead to variations of product properties that are hardly acceptable for modern technologies. Moreover, known methods frequently require heavy and costly equipment, which complicates their implementation on an industrial scale.

Thus, there remains an unresolved need in the art for an improved method of forming tin (IV) oxide nanoparticles.

SUMMARY OF THE INVENTION

It is an object of the present invention to produce tin (IV) oxide crystalline nanometer-scale particles in a powder form ("tin (IV) oxide nanopowder"), which are essentially free of byproducts and have reproducible physical properties.

It is another object of the present invention to provide an efficient and inexpensive method of preparation of such tin (IV) oxide nanopowder.

It is yet another object of the present invention to provide a coating including tin (IV) oxide nanopowder with predictable and consistent properties on a wide variety of substrates that is useful in a number of industrial applications.

It is still another object of the present invention to provide a device, for example an electrode, including tin (IV) oxide nanopowder with predictable and consistent properties.

Accordingly, a tin (IV) oxide nanopowder consisting of crystalline particles with rutile crystalline structure and is essentially free of byproducts, is disclosed herein. Also disclosed herein are methods for preparation of such nanopowder that provide for exclusion of byproducts and use of such nanopowder in coatings and various applications.

A key aspect of the present invention involves preparation of a tin (IV) oxide nanopowder that is essentially free of byproducts by an inexpensive process of a chemical reaction of either a tin chloride or tin sulfates in an ionic melt of alkali metal nitrates followed by cooling, leaching with distilled water, and a thermal treatment. The nanopowder exhibits electrical conductivity that is substantially temperature-independent in a wide range of temperatures.

In general, in one aspect, the invention features a tin oxide nanopowder consisting a plurality of tin (IV) oxide crystalline particles, each of this plurality of crystalline particles having rutile crystalline structure, wherein said nanopowder is essentially free of byproducts.

In general, in another aspect, the invention features a method for preparation of a tin oxide nanopowder consisting a plurality of tin (IV) oxide crystalline particles, each of this plurality of crystalline particles having rutile crystalline structure, that includes providing a tin oxide precursor, providing at least one nitrate of an alkali metal, and creating a starting mixture of this tin oxide precursor and this at least one nitrate. The method further entails heating the starting mixture to a temperature effective for conducting a chemical reaction between the tin oxide precursor and the nitrate, and then curing the starting mixture at this temperature for a period of time until the chemical reaction concludes. The method further includes cooling a resulting mixture to an ambient temperature, leaching the resulting mixture with a liquid solvent thereby creating a suspension, and separating the tin (IV) oxide nanopowder from the suspension. The method concludes with heating the tin (IV) oxide nanopowder and curing it to remove residual moisture therefrom.

DETAILED DESCRIPTION

Figure 1:
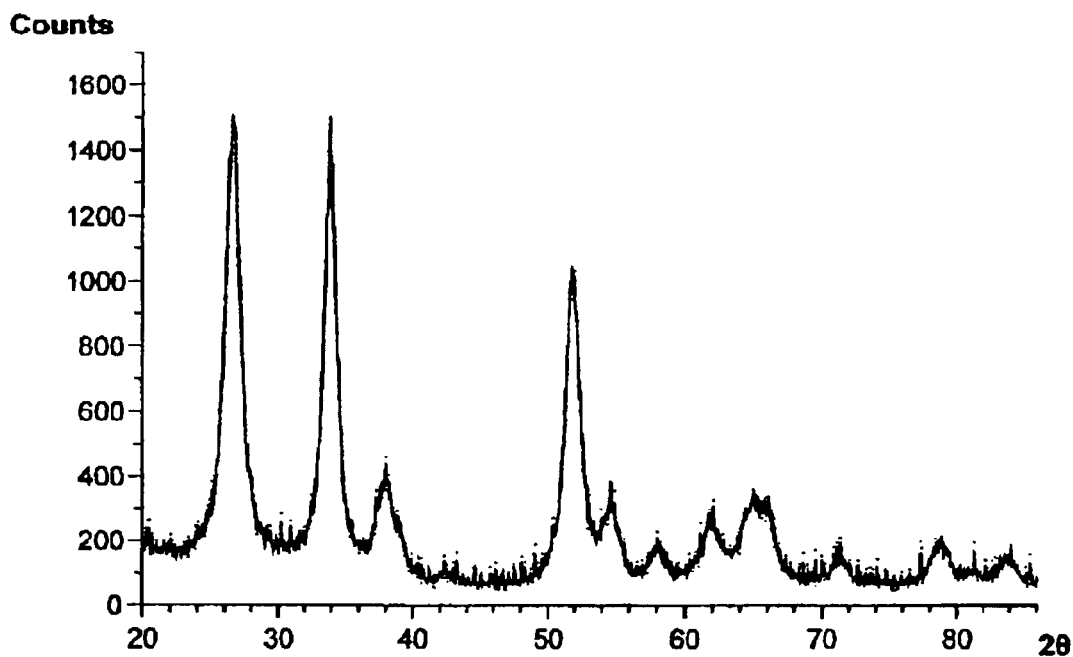
FIG. 1 depicts an X ray diffraction (XRD) pattern of the tin (IV) oxide nanopowder.

The present invention is directed to a process for manufacturing bulk quantities of crystalline tin (IV) oxide nanopowder that is essentially free of byproducts at lower processing temperatures utilizing a tin oxide precursor in an ionic melt of alkali metals. The resulting product tin (IV) oxide nanometer-scale powder ("nanopowder") consisting of nanometer-scale crystalline particles having rutile crystalline structure. This nanopowder is essentially free of byproducts of the manufacturing process.

The method of the invention begins with providing a tin oxide precursor. As used herein, the term "tin oxide precursor" refers to a starting material for the production of tin (IV) oxide nanopowder of the invention. In one embodiment of the invention, the tin oxide precursor is a tin (II) chloride ($SnCl_2 2H_2O$). In another embodiment, the tin oxide precursor is a tin sulfate, for example, a tin (II) sulfate ($SnSO_4$) or a tin (IV) sulfate ($Sn(SO_4)_2 2H_2O$).

The method proceeds with providing at least one nitrate of an alkali metal. In one embodiment of the invention, the nitrate of an alkali metal is a sodium nitrate. In another embodiment, the nitrate of an alkali metal is a potassium nitrate. In yet another embodiment, both nitrates a sodium nitrate and a potassium nitrate are used. In this embodiment, a mass ratio of the sodium nitrate to the potassium nitrate is between about 0.5 and about 2.

The method further proceeds with creating a starting mixture of said tin oxide precursor and said nitrates of alkali metals having mass ratio of the nitrates to the precursor between 3 and 20. In one embodiment of the invention, the starting mixture created by mechanically blending the provided components. In another embodiment, the starting mixture created by milling together prepared quantities of the provided components.

Next step of the method is heating said starting mixture to a first temperature that ranges between about 220° C. and about 500° C., which melts the starting mixture. A cast iron or an aluminum oxide (alumina) crucible can be used to contain the starting mixture.

The method continues with curing the molten starting mixture at said first temperature for a first period of time that ranges between about 20 minutes and about 5 hours. During that time a chemical reaction of said tin oxide precursor, said nitrates, and intermediate oxynitrares, which are initially forming and subsequently decomposing comes to completion.

The method proceeds with cooling a resulting mixture i.e. the reacted starting mixture to ambient temperature. In one embodiment of the invention, the liquid resulting mixture is poured into a quartz pan and left to cool down to ambient temperature. In another embodiment of the invention, the resulting mixture is crushed in a stainless steel pan after cooling to a solid state and before reaching ambient temperature.

The method further proceeds with leaching the resulting mixture with distilled water having a temperature ranging between about 40° C. and about 100° C. that creates a suspension. Crushing of the resulting mixture and mixing can be used to intensify dissolving of the resulting mixture soluble components.

Next step of the method is separating the tin (IV) oxide nanopowder from said suspension. The separation of the nanopowder from the suspension in present invention comprises substeps of: segregating in the suspension a sediment and a solution; testing a sample of said solution for a sulfate or chloride ion presence using any known in the art means; replacing the solution with distilled water; and repeating the segregating, the testing, and the replacing until the testing is negative for said sulfate or chloride ion presence. Centrifuging can be used for the faster segregating.

The method further proceeds with heating the nanopowder to a second temperature that ranges between about 160° C. and about 400° C. In one embodiment of the invention, a temperature of the nanopowder continuously raised until it reached the second temperature. In another embodiment of the invention, the nanopowder initially is heated to an intermediate temperature above 100° C. for a controlled free moisture removal and the heating resumed afterward.

Final step of the method is curing the nanopowder at said second temperature for a second period of time that ranges between about of 10 minutes and about 15 hours, which is effective for removing residual moisture from said crystalline particles.

EXAMPLE

In one particular instance, the process was carried as follows. Chemically pure grade of potassium nitrate $KNO_3$ and sodium nitrate $NaNO_3$ and analytically pure grade of tin (II) chloride $SnCl_2 2H_2O$ were used. The components were ground in an agate mortar, separately weighted, placed together into a plastic beaker in a mass proportion of eleven parts of $KNO_3$ to nine parts of $NaNO_3$, and manually mixed. The nitrates and the tin chloride were mixed in a mass proportion of one part of the tin chloride to ten parts of the nitrates. Then the starting mixture was placed in an alumina crucible, melted in a furnace at 400±20° C. and kept for 1.5 hours at this temperature. After that, the crucible with a resulting mixture was removed from the furnace and emptied into a quartz pan where the resulting mixture cooled down to ambient temperature. After cooling, the resulting mixture was slightly crushed, loaded in a polypropylene container, and the container was filled with hot distilled water. In order to intensify salt constituent dissolution a mixer was used. Mixing proceeded until the salt constituent of the resulting mixture complete dissolution. A centrifuge was used for sedimentation. A sediment and rinse waters were separated via decantation. After each decantation fresh portion of warm distilled water was added in container with the sediment. The content of the container was mixed and centrifuged again repeatedly until negative reaction for chloride ions presence was obtained. Further, the sediment was transferred to a glass pan and dried out in air. Drying proceeded at 110° C. in an oven for about 2 hours. Then temperature was adjusted for a thermal treatment, which proceeded at 180+20° C. for an hour. After that, the product in the glass pan was left in the turned off oven to cool down to ambient temperature.

The samples of the product tin (IV) oxide nanopowder produced according to present invention were studied by chemical analysis and an X-ray powder diffraction technique (XRD) with $CuK_\alpha$ radiation and DRON-3M diffractometer. The XRD pattern of the product obtained (FIG. 1) corresponds to the basic rutile structure with the lattice constants close to described in *J. Electrochem. Soc.*, 123, No.7, 199C (1976) i.e. a=b=4.737A and c=3.185A. The ionic radii for $O^{2-}$ and $Sn^{4+}$ are 1.40 and 0.71A, respectively. Average particle size of the tin (IV) oxide nanopowder was calculated from distinctive broadening of XRD peaks, which occurs when the particles are smaller than 100 nm. The Scherer's Equation was used:

$$d = k\Lambda/B \cos \Theta,$$

wherein d is the particle size, k=0,9 is shape factor, Λ is the wave length of x-ray (here, the value of Λ of $CuK_\alpha$ is 1.5418A), Θ is the Bragg angle (here, 2 Θ=26.8°), B is a widening of a Bragg XRD peak, which is calculated, after measuring the half-width of the peak (Λ in radians), from Warren's equation:

$$B^2 = B^2_{sample} - B^2_{standard}$$

Ceramic tin dioxide treated thermally at 1380° C. was used as a standard. As it follows, the size of crystallites for XRD pattern of FIG. 1 is: peak at 2Θ=26,8°, $Cu_{K\alpha}$-radiation;

$B_{standard}$=0,085°=0,00148 Rad;

$B_{sample}$=0,775°=0,01353 Rad;

d=10.8 nm.

This powder was easily pressed into the pellets even with no binder additives.

The pellets for conductivity measurements with volume density 3.4 g/cm , 11.5 mm diameter and 2.5 mm thickness were prepared under the pressure of 9.44×10$^8$ Pa from the sediment at ambient temperature and then dried in air for 2 hours at 110° C. Nickel current collectors of about 10 μ thickness were vacuum deposited onto the ends of the pellets. The conductivity of such samples was registered with AC automatic bridge equipment. The measuring Teflon cell was placed into the thermoelectric chamber where the temperature varied from 36 to +250° C. The AC frequency was 1 KHz.

Figure 2:
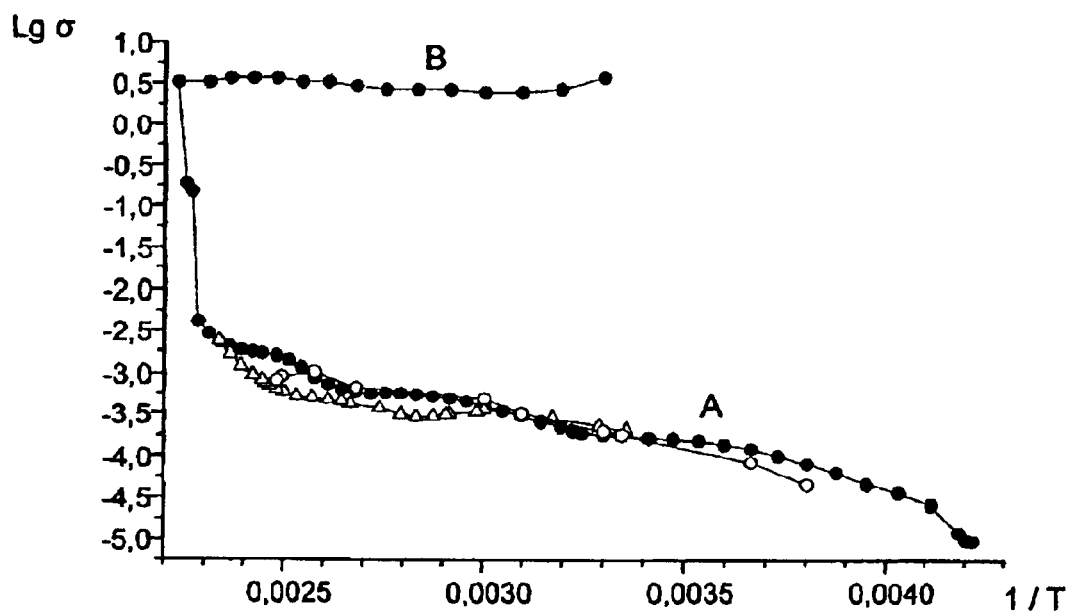
FIG. 2 depicts a dependence of conductivity logarithm of the tin (IV) oxide nanopowder compressed to a volume density of about 3.4 g/cm$^3$ vs. the reverse temperature in the range of $-35-+180°$ C.

FIG. 2 shows the temperature dependence of the nanocrystalline $SnO_2$. As follows from the qualitative determination of Seebeck coefficient, the conductivity is provided by negative carriers (n-type semiconductor). However, the value of conductivity turns to be about 2–3 orders of magnitude lower than expected. The experimental values of conductivity reproduce themselves when heating up to 150° C. and cooling down as represented by the curve A. However, the conductivity rises sharply by 3 orders of magnitude near 160° C. reaching the value in range of 24 Sm/cm. After this irreversible transition, the conductivity does not return to its original values keeping practically independent of temperature in the range of 35 to 180° C. as represented by the curve B. Thus, the electric properties of nanocrystalline $SnO_2$ change sharply and irreversibly when heating to the temperature near 160° C. Nevertheless, the XRD pattern of the oxide after such transformation remains unchanged. The sign of Seebeck coefficient remains also negative. Hence, the jump of conductivity is not related to any deep structural changes of the sample. As follows from the temperature dependence (FIG. 2, A), there are three kinds of donors with energy levels 0.08, 0.072 and 0.148 eV, which are depleted consequently above 5, 72 and 127° C. correspondingly. These are attributed to the presence of small quantity of bound water in the low-temperature form of the sample. The moisture is removed irreversibly at 160° C. and thus, the conductivity rises sharply.

In another aspect, this invention includes a device, for example a rechargeable battery. The device comprises at least one component, which comprises the nanopowder according to present invention. The component, for example an electrode, can be a wire or plate or coil, straight or curved, smooth or rough or wavy, thin or thick, solid or hollow, and flexible or non-flexible. It is important in all cases that the electrode be conductive and stable at the usage temperatures. It is preferred that the electrode composition does not react with the environment during the manufacture or use of the device. The component can be prepared using one of the manufacturing methods used currently in the art or a combination thereof. Examples of processes, which can be used at some stage, include but are not limited to pressing, extrusion, molding, screen-printing, tape casting, spraying, and centrifugal forming. The nanopowder in the component can be porous or dense, thin or thick, covered with a barrier or exposed. One of ordinary skill in the art will realize that other device architectures can also be used in the presently claimed invention.

In another aspect, this invention also includes an improved sensor device. Sensors (and sensor arrays) can be manufactured by numerous methods and the benefits of the nanopowder according to present invention can be practiced with any of these methods. For example, the nanopowder is mixed with a solvent to form slurry. The slurry is brushed onto screen-printed electrodes and allowed to dry at to remove the solvent. A dissolved polymer may also be included in the slurry. The improved sensor device can also be prepared from a screen printable paste. The nanopowder and polymer are mechanically mixed; a screen-printing vehicle is added to the mixture and further mechanically mixed. The mixture is screen printed onto prepared electrodes. The paste is allowed to level and dry. While the teachings here describe a single layer thick film, they apply to thing film and multilayer architectures as well.

According to present invention dense sputtering targets can also be prepared using the nanopowder. These targets can then be used in sputtering, vapor deposition, electrochemical, electrophoretic, or thermophoretic deposition of thin films. Densification of powders, or sintering, is essentially a process of removing the pores between the starting particles, combined with growth and strong bonding between adjacent particles. For example, the nanopowder is placed in a die and pressed to green densities of 40% or higher. Alternatively, molding, coatings, gel casting, dip coating, screen-printing, extrusion, and any of techniques known in the art can be used to form a body from the nanopowder. Next, the body is sintered using a temperature, time, atmosphere, and electromagnetic field sufficient to reach desired density.

Another beneficial effect of using the nanopowder is that, because of high surface area and surface diffusivity, it may be sintered without impurity inducing sintering aids, resulting in more reliable sintered products which exhibit enhanced service temperatures and high temperature strength. Other anticipated benefits include commercially attractive processing times and temperatures, and the ability to sinter devices at temperatures that prevent undesirable secondary reactions or transformations during device fabrication.

According to present invention the nanopowder is used to make coatings, particularly transparent conductive coatings. Thin film layers can be deposited by electron-beam evaporation or sputtering. Roll or web coating on polymer substrates is done by magnetron or other techniques of sputtering. Typical applications of coated with the nanopowder substrates include touch panel contacts, electrodes for LCD and electrochromic displays, energy conserving architectural windows, defogging aircraft and automobile windows, heat-reflecting coatings to increase light bulb efficiency, gas sensors, antistatic window coatings, wear resistant layers on glass, etc.

Obvious advantages of the devices and the coatings comprising the nanopowder as described in present invention are: lower processing temperatures, easier controlled manufacturing environment, and close to theoretical, predictable, and reproducible behavior in manufacturing and utilizing.

Although the description above contains much specificity, it should not be construed as limiting the scope of the invention but as merely providing illustrations of some of the presently preferred embodiments of this invention. Thus the scope of the invention should be determined by the appended claims and their legal equivalents, rather than by the examples given. It will be apparent to those skilled in the art that various modifications and variations can be made to the above-described structure and methodology without departing from the scope or spirit of the invention.

What is claimed is:

1. A tin oxide nanopowder consisting a plurality of tin (IV) oxide crystalline particles, each of said plurality of crystalline particles having rutile crystalline structure, wherein said nanopowder is essentially free of byproducts.

2. The nanopowder according to claim 1, wherein each of said plurality of crystalline particles has greatest measurement no more than about 30 nm.

3. The nanopowder according to claim 1, compressed to a volume density of about 3.4 g/cm$^3$ has an electrical conductivity within the range of 2 to 4 Sm/cm, said electrical conductivity is substantially temperature-independent.

4. A method of preparation a tin oxide nanopowder consisting a plurality of tin (IV) oxide crystalline particles, each of said plurality of crystalline particles having rutile crystalline structure comprising the steps of:
    (a) providing a tin oxide precursor;
    (b) providing at least one nitrate of alkali metal;
    (c) creating a starting mixture of said tin oxide precursor and said at least one nitrate of alkali metal;
    (d) heating said starting mixture to a first temperature effective for conducting a chemical reaction of said tin oxide precursor and said at least one nitrate of alkali metal;
    (e) curing said starting mixture at said first temperature over a first period of time effective for completion of said chemical reaction;
    (f) cooling a resulting mixture to an ambient temperature;
    (g) leaching said resulting mixture with distilled water thereby creating a suspension;
    (h) separating said tin oxide nanopowder from said suspension;
    (i) heating said tin oxide nanopowder to a second temperature effective for removing residual moisture therefrom; and
    (j) curing said tin oxide nanopowder at said second temperature over a second period of time effective for removing said residual moisture.

5. The method according to claim 4, wherein said tin oxide precursor is a tin compound selected from the group consisting of: tin (II) chloride, tin (II) sulfate, and tin (IV) sulfate.

6. The method according to claim 4, wherein step (h) comprises the substeps of:
    (a) segregating in said suspension a sediment and a solution;
    (b) testing said solution for a sulfate or chloride ion presence;
    (c) replacing said solution with distilled water; and
    (d) repeating said segregating, said testing, and said replacing until said testing is negative for said sulfate or chloride ion presence.

7. The method according to claim 4, wherein said at least one nitrate of alkali metal comprises sodium nitrate, potassium nitrate, or both thereof nitrates with a mass ratio of said sodium nitrate to said potassium nitrate being between about 0.5 and about 2.

8. The method according to claim 4, wherein a mass ratio of said at least one nitrate of alkali metal to said tin oxide precursor is between about 3 and about 20.

9. The method according to claim 4, wherein said first temperature ranges between about 220° C. and about 500° C. and said first period of time ranges between about 20 minutes and about 5 hours.

10. The method according to claim 4, wherein said second temperature ranges between about 160° C. and about 400° C. and said second period of time ranges between about 10 minutes and about 15 hours.

11. The method according to claim 4, wherein said distilled water has a temperature ranging from about 40° C. to about 100° C.

12. A coating comprising the nanopowder according to claim 1.

13. The coating according to claim 12, wherein said coating is antistatic.

14. The coating according to claim 12, wherein said coating is transparent.

15. The coating according to claim 12, wherein said coating is electricity generating.

16. The coating according to claim 12, wherein said coating is reflective.

17. A device comprising at least one component comprising the nanopowder according to claim 1.

18. The device according to claim 17, wherein said component is an electrode.

19. The device according to claim 17, wherein said component is a sensor.

20. The device according to claim 17, wherein said component is a source of a material for a position on a surface.

* * * * *